United States Patent [19]
Glenn

[11] Patent Number: 5,406,261
[45] Date of Patent: Apr. 11, 1995

[54] COMPUTER SECURITY APPARATUS AND METHOD

[76] Inventor: James T. Glenn, 3707 Meadow Spring, Sugarland, Tex. 77479

[21] Appl. No.: 2,645

[22] Filed: Jan. 11, 1993

[51] Int. Cl.⁶ .................. G08B 13/14; G08B 13/22
[52] U.S. Cl. .................. 340/571; 340/500; 340/540; 340/568; 340/825.37
[58] Field of Search ........... 340/571, 568, 540, 500, 340/825.37

[56] References Cited

U.S. PATENT DOCUMENTS 4,804,943  2/1989  Soleimani .................. 340/571
4,908,604  3/1990  Jacob ........................ 340/539
5,153,561  10/1992 Johnson ..................... 340/571

Primary Examiner—Glen Swann
Attorney, Agent, or Firm—Honigman Miller Schwartz and Cohn

[57] ABSTRACT

Unauthorized access to a computer system is prevented by controlling power distribution to components within the computer system by a remotely controllable switch. An authorized computer user utilizes a radio frequency, infrared, ultrasonic or other type of wireless coded signal transmitter to send coded signals to a matching wireless receiver within the computer system that controls the power distribution switch. The computer user may additionally set an alarm that will sound if the computer system is tampered with or attempted to be used when disabled. Highly sensitive data is protected from being compromised by disabling the read circuits of the computer system data storage memory and for ultra critical data, the data storage system may be rendered permanently inoperative.

29 Claims, 13 Drawing Sheets

COMPUTER SECURITY APPARATUS AND METHOD

BACKGROUND OF THE INVENTION

1. Field of the Invention

This invention relates generally to computer security devices, and in particular to an apparatus and method that prevents unauthorized access to a computer system and generates an alarm signal if the computer system is tampered with or moved such as during theft of the computer system.

2. Description of the Related Technology

Computers, especially personal computers have gained substantial popularity among individual users at work or when working at home. Personal computers are now being utilized for jobs heretofore performed by mainframe computers and mini-computers. The rapidly growing popularity in the use of personal computers may, in part, be attributed to the substantial improvement in its speed of operation, ease of use, data storage capacity, and sophistication in displaying information to the computer user.

This has resulted in personal computers becoming more prevalent in the work place, and with more and more people depending on their livelihoods from the use thereof. Advances in computer technology have reduced the size of sophisticated and expensive personal computers, making these desirable late model computers easier to steal. This is especially true for the portable and note book computers in use by travelling business persons and other professionals.

As crime increases, there is a need for those using and owning personal computers to protect their property and work product from theft. To this end, some form of security for protecting the computer system is desirable. Security is required to prevent theft of the personal computer system and illegal access to the data contained therein. Theft of the computer itself sometimes is not as great a loss as the data contained therein. The data may be of such significance as to warrant extreme measures in protecting it.

Protection from and deterrence of theft of computer data is of paramount importance to all who use computer systems. An industrial spy need not expend a great deal of effort to copy critical computer data files from a computer onto an easily transportable floppy disk. Computer data may comprise, for example, trade secrets, customer lists, employee wages and evaluations, marketing plans, discount lists and other sensitive business information that would have value to a competitor. In the case of government and military computers, computer data may comprise top secret information such as battle plans, launch codes and other highly sensitive information that could greatly compromise government or military operations throughout the world.

Attempts at preventing theft of computers have been implemented by anchoring the computer to the desk top with locking or cable means and protection of data with a key lock switch on the front panel of the personal computer itself. However, cables and locks can be cut and the computer disable key lock switch may be by-passed. Encoding data is a method of safeguarding computer records but requires extra enciphering and deciphering programs which increase access decoding and storage encoding time when a user wants to work with the data.

What is needed is an easily implemented way to deter theft of computer systems and to ensure that data cannot be retrieved by unauthorized persons. Some form of preventing unauthorized access of a computer system should be provided. If unauthorized access or removal of the computer system is attempted, an alarm will sound. Ultimately, if the computer system is stolen or otherwise compromised, the data should be permanently rendered unaccessible. Ideally, the security safeguards would be transparent to the authorized computer operator during normal use of the computer system.

SUMMARY OF THE INVENTION

In contrast to prior methods and apparatus for protecting computer systems from theft and unauthorized use thereof, the present invention provides for an easily operable means to prevent theft and unauthorized operation of a computer system and access of data contained therein. In addition, the present invention will signal an alarm if theft or unauthorized operation of the computer system is attempted.

An object of the present invention is to provide for an easily operable security lock to prevent unauthorized operation of a computer system and access of data contained therein.

Another object of the present invention is to provide for detection of and alarm when an unauthorized person attempts to access or remove the computer system.

A further object of the present invention is to protect highly sensitive data by destroying or disabling access to the data if the computer system security is breached.

Still a further object of the present invention is to selectively disable parts of the computer system for different levels of user access.

Yet another object of the present invention is to control access to a group of computers such as, for example, in a school class room.

Another object of the present invention is to prevent access to a computer system by disabling power to the computer system circuits and activate an alarm thereafter.

A further object of the present invention is to prevent access to a computer system during non-business hours by using a programmable clock that once set will disable the computer system until a preset time has elapsed.

The present invention accomplishes these objects by inhibiting electrical power to the computer system electronic components, and enabling an alarm that signals when unauthorized access or movement of the computer system is attempted. The present invention may be connected between the computer system power supply and components of the computer system such as, for example, floppy disk drives, hard disk drives, system board, keyboard, etc., for the purpose of partially or completely disabling the computer system. Power may be removed from these components by using a relay, transistor, a plurality of transistors, or a semiconductor switching device such as a power integrated circuit. The present invention utilizes a coded access key that may be a remote control means that can be carried in the pocket or purse of an authorized computer user. The computer can only be enabled by this coded access key. In addition, the remote control coded access key can enable an alarm after the computer system has been disabled.

A motion sensor may be used to detect if the computer is being moved or tampered with, and if the alarm is enabled, an audible alarm signal will result. The alarm may be, for example, an electronic siren that produces a plurality of high decibel sounds. In similar fashion, a signal sensor monitoring keyboard signals may used to detect unauthorized access of a locked computer system.

For highly sensitive data, such as business or military plans, a means to permanently disable access to this data may be installed that would destroy the circuitry of the storage media so that even if the computer were successfully stolen and the locking device removed therefrom the memory storage device would be useless and the data would be unrecoverable.

A high voltage from the present invention may be connected to the memory read circuits for permanently disabling these circuits. The present invention may also utilize a chemically reactive device such as, for example, a microexplosive charge or acid to make the disk storage memory inoperative. A time delay circuit can be utilized to prevent permanent damage to the computer memory system if the alarm is inadvertently set off by mistake.

The preferred embodiment of the present invention utilizes wireless remote control means that use, for example, radio frequency, infrared, or ultrasonic signals. The wireless remote control signals may be further encoded or keyed so as to be operative for only one specific computer system. The encoded control signals may have a large number of unique code combinations for use with any number of corresponding computer systems.

The present invention utilizes a remote control key lock transmitter that transmits control signals to a corresponding receiver. The receiver decodes the control signals and controls the various functions of the present invention. These functions control the power distribution within the computer system, activate and deactivate the alarm, and arm and disarm the memory destruct means.

A motion switch may be used to detect if the computer is being moved and cause the alarm to operate, for example, a bell or siren or other noise making device. This noise will alert security personnel who will prevent the computer system from being stolen. An internal battery powers the alarm so that the person carrying the pilfered computer system would be quite noticeable while walking through an office that was occupied or passing security guards in a building that was vacant in the evening.

Data may be protected without disabling the entire computer system by selectively disconnecting power to specific subsystems such as peripheral devices like floppy disk or hard disk drives so that access could not be made thereto. The present invention may utilize different access codes from the remote control transmitter to perform any number of selectable functions. One function is controlling a plurality of computers in a classroom so that students could not play with the computers while the teacher is trying to explain a lesson. A group control function can be incorporated into the present invention for institutional or school use so the teacher has control of the computers throughout the classroom. Another function is for information and display computers where limited access is desired but some form of program security is required.

The remote control transmitter, using radio frequency, infrared, ultrasonic, or voice signals, would be limited in control distance so that it could not inadvertently disable other computer systems having similar control codes; however, it also could be encoded such that each control code is unique to a particular computer system. In addition, a time lock could be incorporated in the present invention so that once the system was locked it would not reactivate again until the next morning to prevent inadvertent or unauthorized access to the computer system, for example, during the night. A thumbprint could be utilized without the need for a remote transmitter key. Thumbprint access is more secure because there is no remote transmitter that may be stolen and used illegally and one's thumbprint cannot be lost or misplaced. In similar fashion, a voice recognition receiver may be used to decode unique voice commands.

The present invention may be incorporated into a personal computer as a separate add in board that can be connected between the power supply and the computer system components. The computer user may easily connect the present invention into the computer system by unplugging the existing power cable connections and plugging in the connector cables adapted for interface with the existing power cables of the computer therebetween. The invention can also be incorporated into new products such as lap top computers by designing the necessary circuitry into the computer system itself. The present invention can be powered by the computer system batteries for operation and alarm signalling. The present invention is especially appropriate for lap top computers that are easily stolen. All of the above features can be incorporated into a lap top computer such as, for example, high decibel sound alarm, shut down and lock out of peripheral devices, and in extremely sensitive data environments the destruction of the memory storage means after a certain time delay.

A feature of the present invention is delaying for a predetermined time the disabling of memory storage access.

Another feature of the present invention is preventing access to sensitive data if the computer is used by unauthorized people.

An advantage of the present invention is a security system that is easy to use and transparent in operation to the computer user.

Another advantage of the present invention is an audible alarm that signals security guards that the computer is being stolen.

Other and further objects, features and advantages will be apparent from the following description of a presently preferred embodiment of the invention, given for the purpose of disclosure and taken in conjunction with the accompanying drawings.

DETAILED DESCRIPTION OF THE PREFERRED EMBODIMENT

Figure 1:
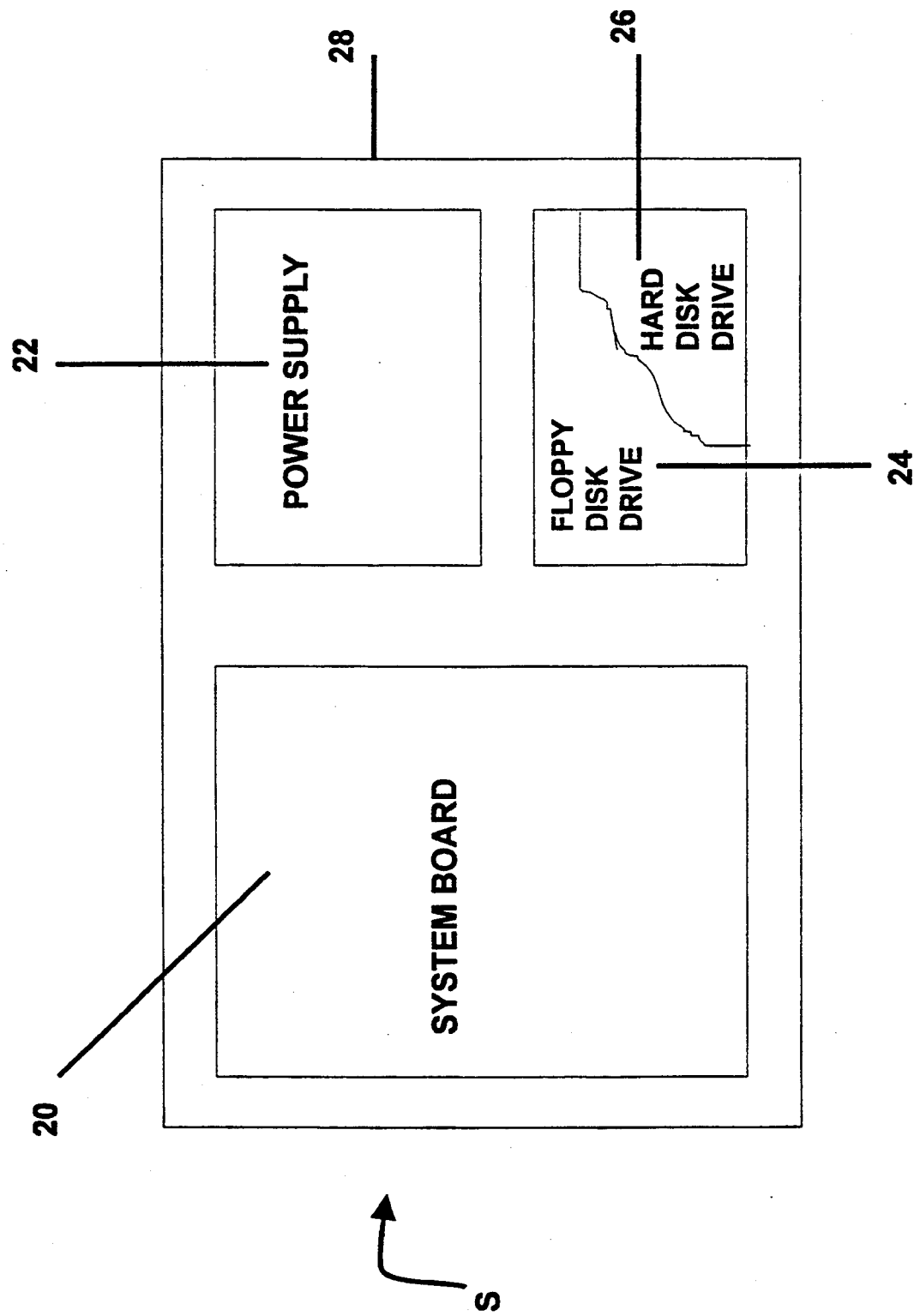
FIG. 1 is a schematic plan view of a computer system.

Referring now to the drawings, the details of the preferred embodiment are schematically illustrated. In the drawings the letter S designates generally a computer system. The computer system S is illustrated in plan view schematically in FIG. 1. System S is comprised of a system board 20 containing the majority of the electronic components (not illustrated), a power supply 22, floppy disk drive 24, hard disk and drive 26, and a case 28 enclosing the aforementioned components.

Figure 2:
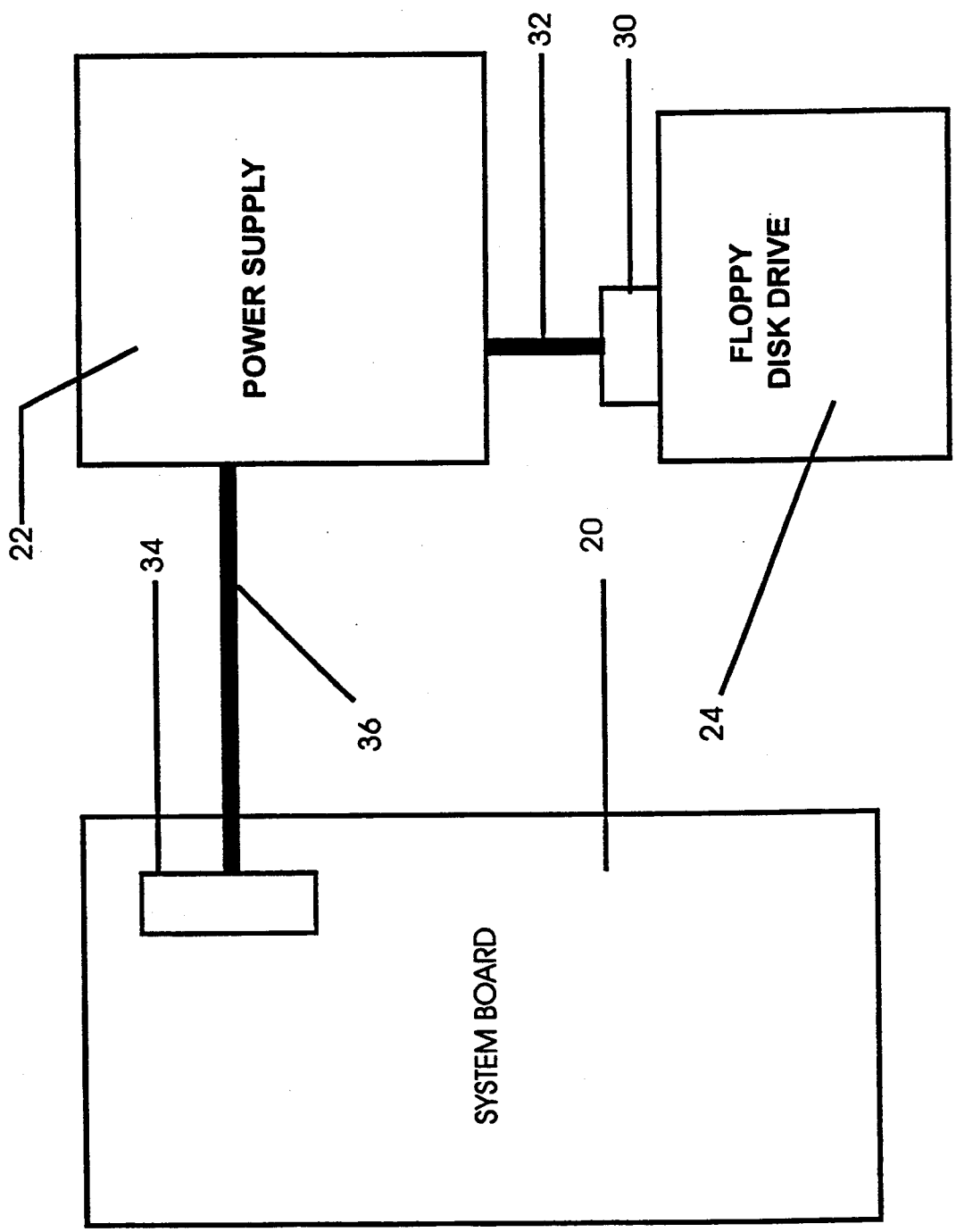
FIG. 2 is an enlarged plan view of FIG. 1.

Referring now to FIG. 2, an enlarged partial plan view of FIG. 1 illustrates electrical power connections from the power supply 22 to the system board 20 and disk drive 24. Power is connected from power supply 22 to disk drive 24 through power connector 30 and power cable 32. Similarly, power is connected to system board 20 through power connector 34 and power cable 36.

Figure 3:
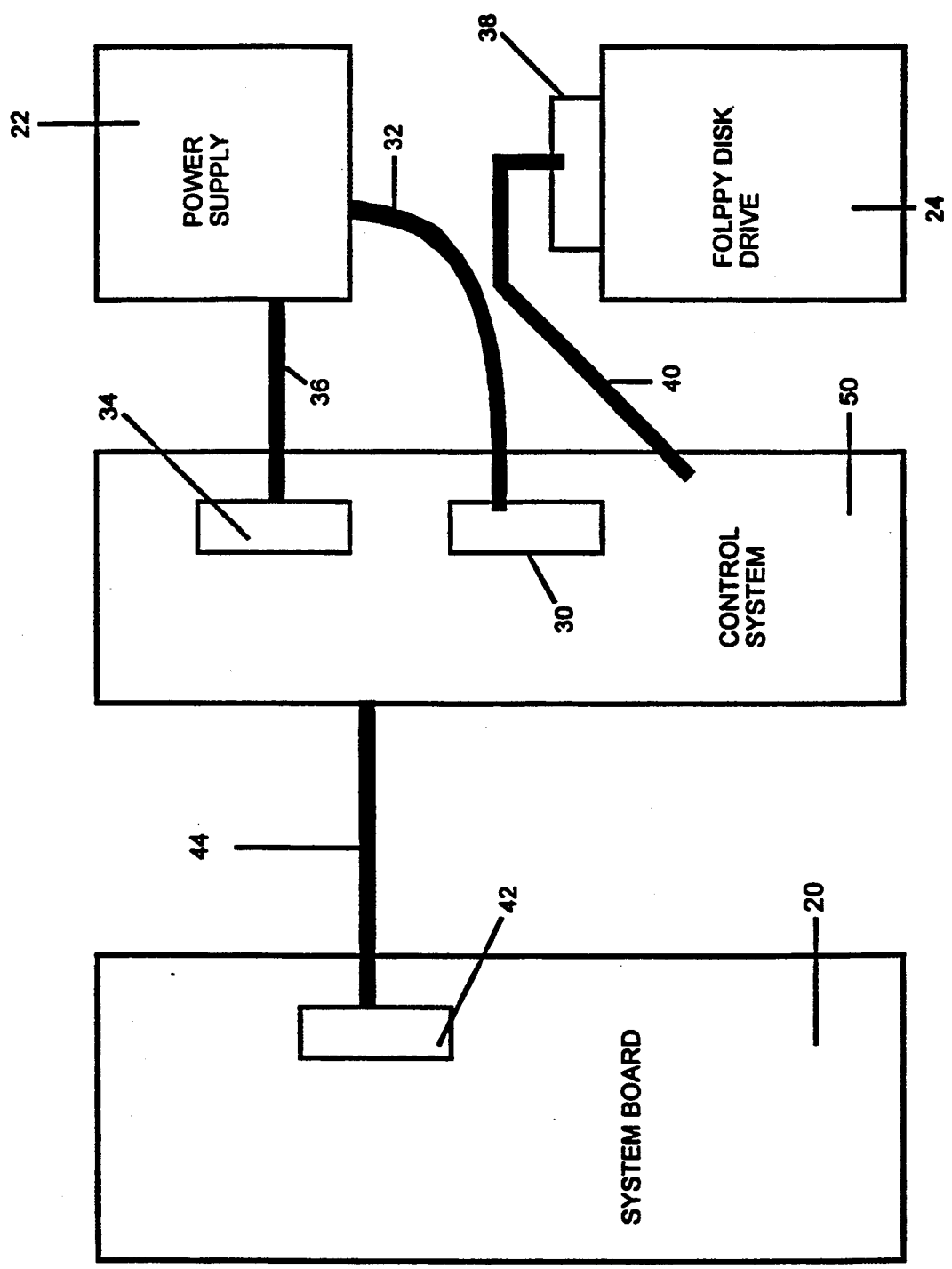
FIG. 3 is a schematic plan view illustrating connection of the present invention to the computer system.

The preferred embodiment of the present invention is electrically connected between the power supply 22, system board 20, and disk drive 24 as illustrated schematically in the plan view of FIG. 3. The control and alarm system 50 of the present invention connects to the power supply 22 through connectors 30 and 34, and cables 32 and 36, which previously supplied power to drive 24 and system board 20, respectively.

The control system 50 electrically connects to system board 20 through connector 42 and cable 44, and to disk drive 24 through connector 38 and cable 40, respectively. Control system 50 controls power from the power supply 22 to the system board 20 and disk drive 24. Power to any number of computer system S components may be controlled through control system 50. The present invention, illustrated schematically in FIG. 3, can be easily installed in an existing computer system S by unplugging the power connector/cables from the computer devices to be controlled and connecting the control system 50 of the present invention therebetween.

Figure 4:
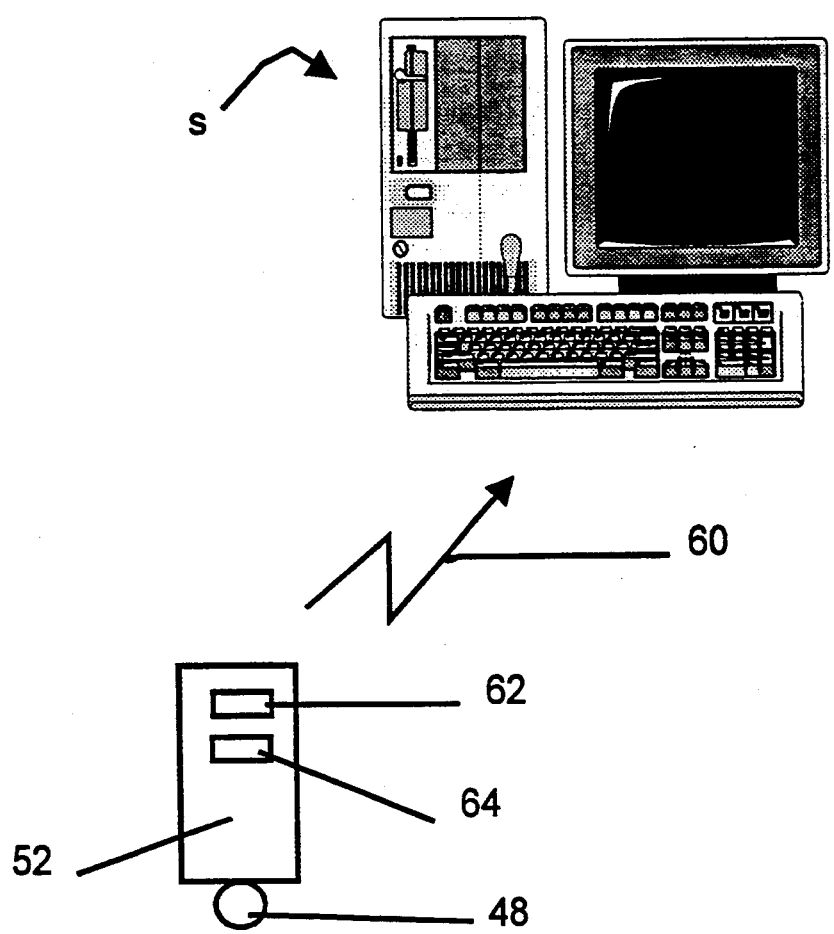
FIG. 4 is a schematic elevational view of the computer system and a remote control transmitter of the present invention.
Figure 5:
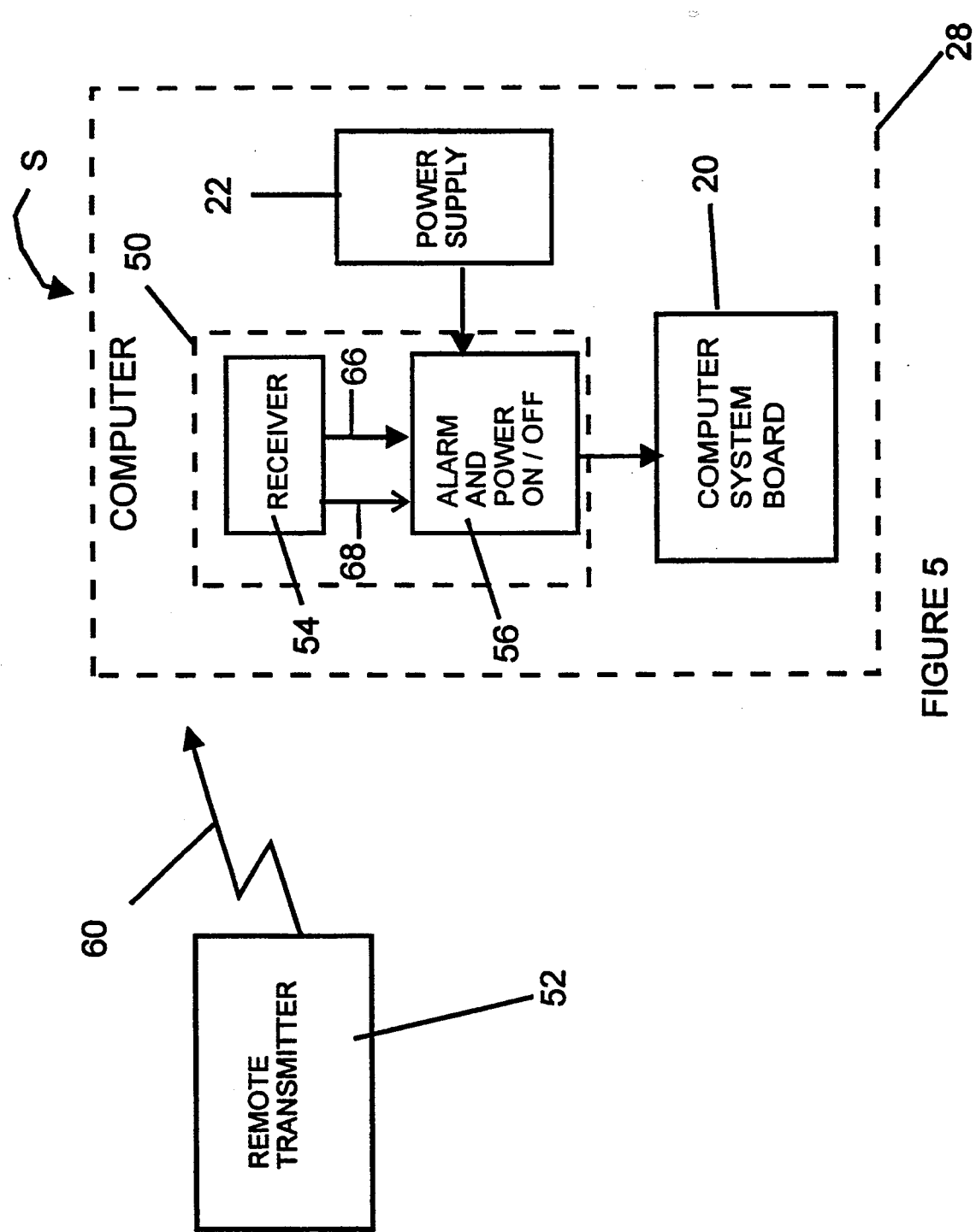
FIG. 5 is a schematic block diagram of a preferred embodiment of the present invention.
Figure 6:
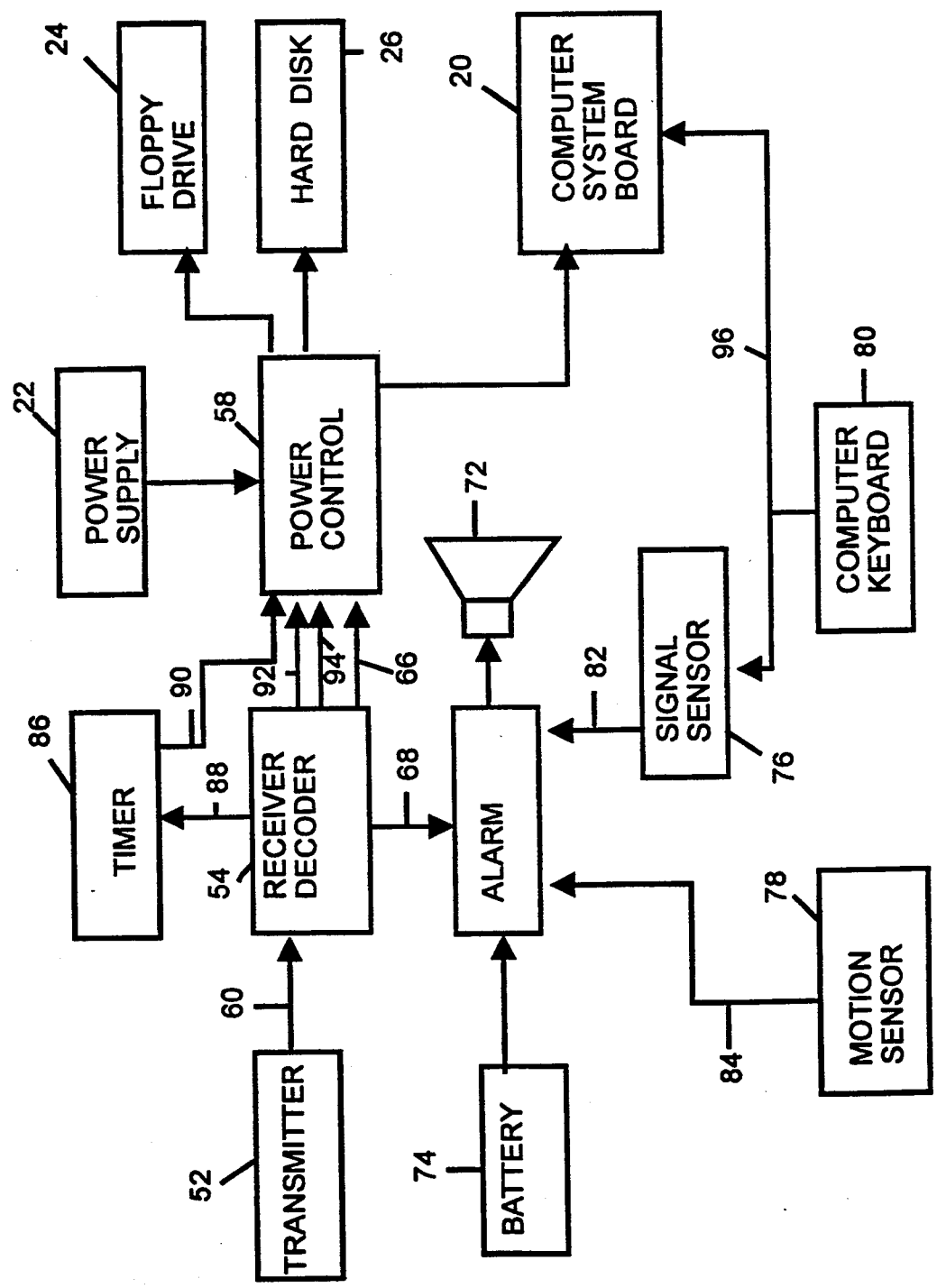
FIG. 6 is a schematic block diagram of a preferred embodiment of the present invention illustrating an alarm function.

Referring now to FIGS. 4 through 6, the control system 50 is controlled by a remote transmitter 52 having system on/off button 62, alarm enable/disable button 64, and key chain attachment 48. The remote transmitter 52 sends a control signal 60 which may be, for example, a radio frequency modulated by control tones or pulse codes, infrared pulse modulated, ultrasonic pulses, or other short distance wireless means of control.

Figure 9A:
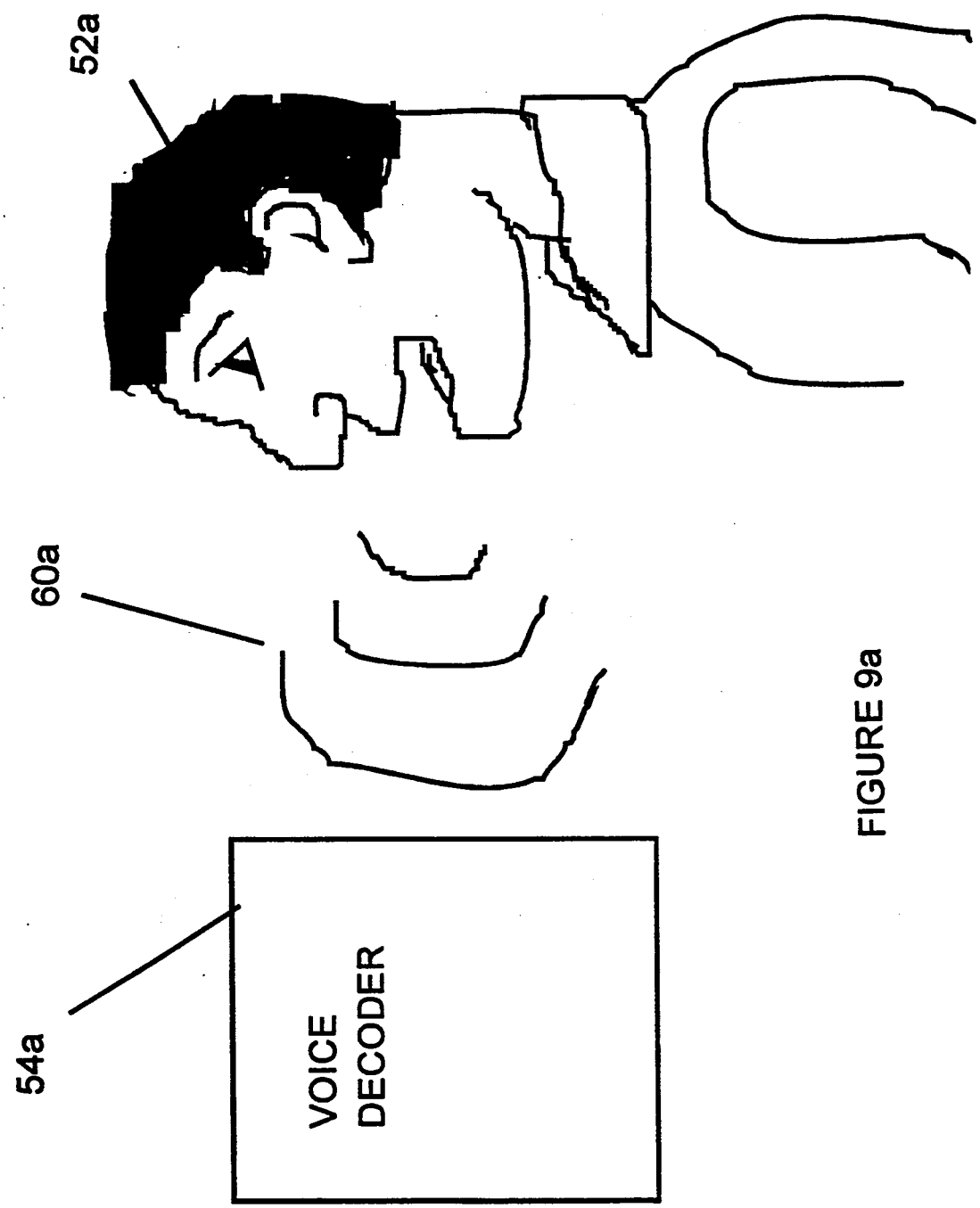
FIGS. 9a and 9b are schematic block diagrams of alternative embodiments of FIG. 6.
Figure 9B:
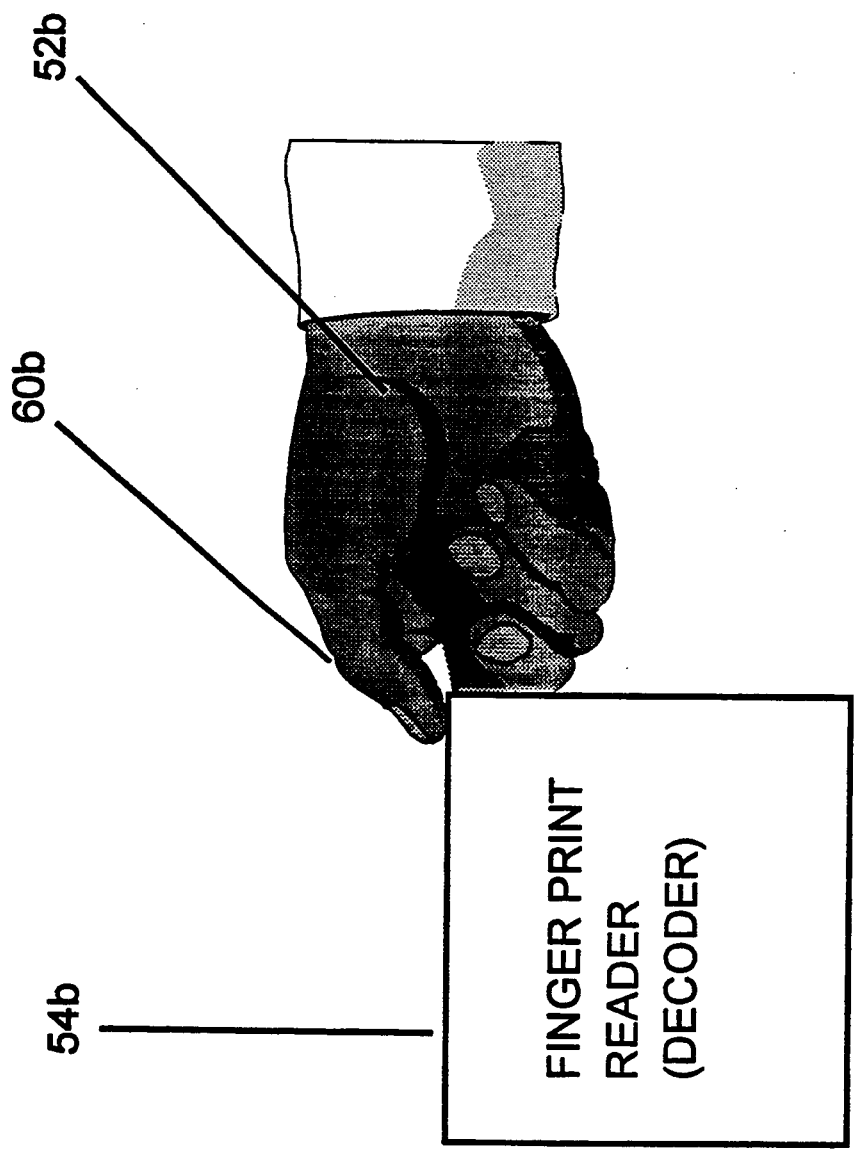

A receiver 54 (FIG. 5) receives the control signal 60 from the transmitter 52 and converts the control signal 60 into control functions. These control functions can be utilized to control a means for alarm and power on/off 56. When buttons 62 or 64 are pressed, a control signal 60 is sent by the transmitter 52 to receiver 54. Receiver 54 decodes and converts the control signal 60 into control functions 66 and 68 for controlling the computer system S power and alarm, respectively. Many other control functions can be implemented by using other decoded unique control functions. The receiver may also be a voice decoder 54a (FIG. 9a) or a finger print reader-decoder 54b (FIG. 9b). The transmitter may also be a person speaking 52a (FIG. 9a) or a hand 52b (FIG. 9b). The control signal may also be spoken words 60a of the person 52a (FIG. 9a) or a thumbprint 60b from the hand 52b (FIG. 9b).

FIG. 6 illustrates a more detailed schematic block diagram of the preferred embodiment of the present invention. Transmitter 52 sends a control signal 60 having unique control codes that are received and decoded in receiver/decoder 54. Decoder 54 uses these decoded control codes to generate control functions 66, 68, 88, 92 and 94. Power control 58 receives these control functions and switches power from the power supply 22 according to each of the respective control codes.

Control function 66 controls the power control 58 which turns power on and off to the computer system board 20 thus enabling or disabling the computer system. Control function 88 signals timer 86 to begin timing a predetermined length of time. Timer 86 may be used to lock out power to the computer system board 20 for the predetermined length of time. Timer 86 may be programmed with a predetermined time interval and used to prevent access to the computer system during that programmed time interval, for example, during the night.

The timer 86 may also be automatically enabled whenever the computer system is turned off and it is, for example, during the night. Thus, timer 86 may be a 24 hour clock having presettable enable and disable times that once the computer system is turned off, the computer system will remain off until the preset enable time happens. This feature of the present invention may prevent unauthorized access of the computer system if the transmitter 52 is inadvertently left at the office or found (stolen) by an unauthorized person.

Control functions 92 and 94 control the power control 58 to turn power on and off to the computer system floppy drive 24 and hard disk drive 26, respectively. The present invention can be used to selectively enable and disable computer system components such as the disk drives by removing power therefrom. Selectively controlling power to computer system components allows the computer to function with different users such as, for example, in a class room or show room where normal use of the computer system is for canned programs that do not require floppy disk access. Locking out floppy disk access while retaining operation of the computer system also improves security thereto. Various floppy disk drive mechanical lockout devices have not proven to be totally effective because they can be removed, thus, allowing access to the floppy drive.

Control function 68 enables and disables alarm 70. The alarm 70 is powered by a battery 74, and emits an audible alert signal through speaker 72. When the alarm 70 is enabled by control signal 68, a motion sensor 78 or signal sensor 76 will cause the alarm to signal an alert. Motion sensor 78 detects when the computer system S is moved, such as when being carried off by a thief. Motion sensor 78 sends a motion detect signal 84 to the alarm 70, and if alarm 70 is enabled, will cause an audible alert on speaker 72. The motion sensor 78 may be a mercury switch or tumbler switch as is well known in the art of security systems.

Signal sensor 76 detects an attempt to access the computer system through a keyboard 80. Sensor 76 detects keystroke signals from the keyboard 80 and sends a detect signal 82 to the alarm 70 which alarms if enabled. The keystroke signals 96 may be selectively detected by signal sensor 76 so that certain keystrokes such as, for example, Disk Operating System (DOS) commands can be screened that can be used to copy or erase data such as Copy, Delete, Format, Disk Copy, or Rename.

Figure 8A:
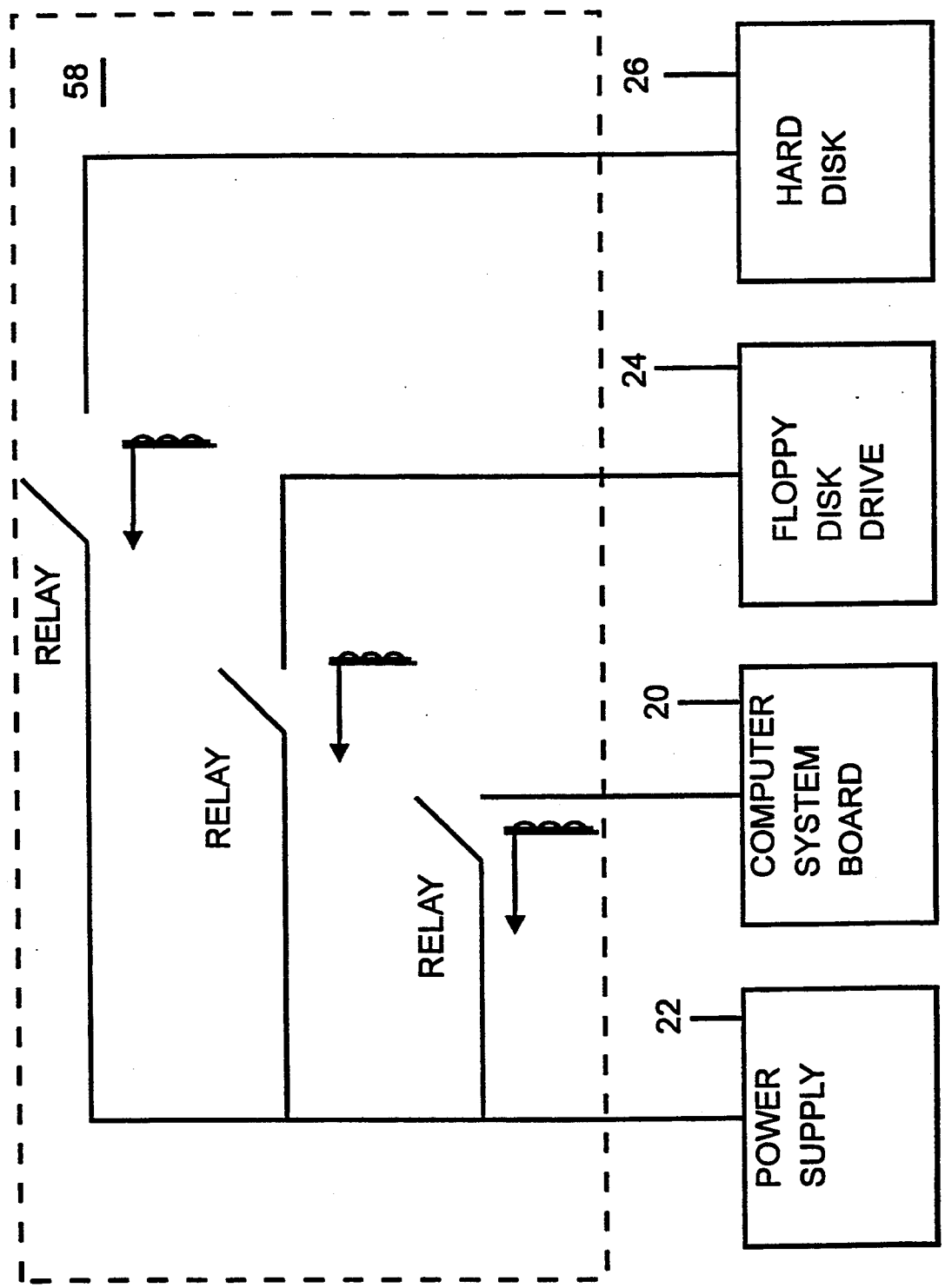
FIGS. 8a-8d are schematic block diagrams of preferred embodiments of the control circuits illustrated in FIG. 6.
Figure 8B:
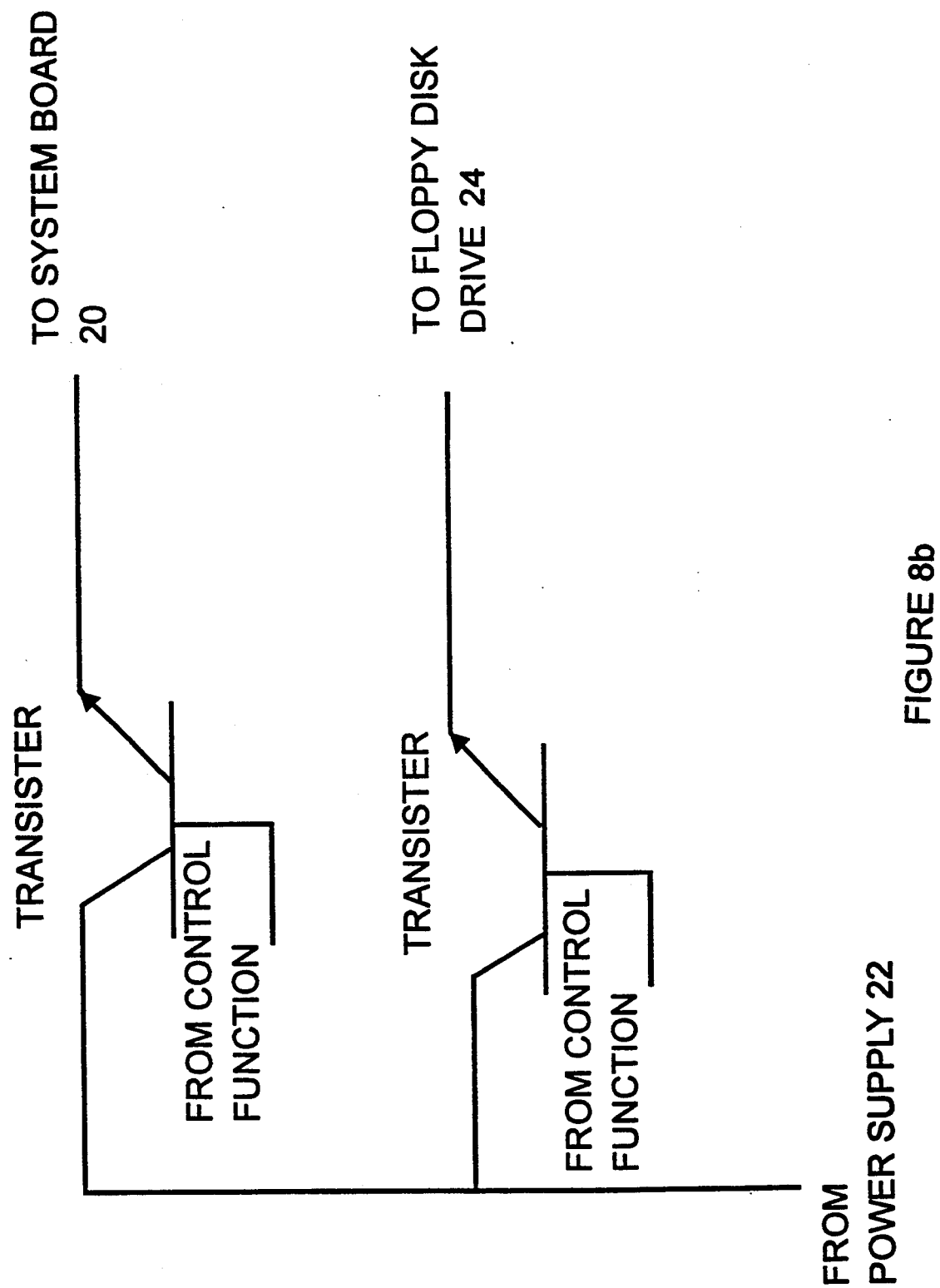
Figure 8C:
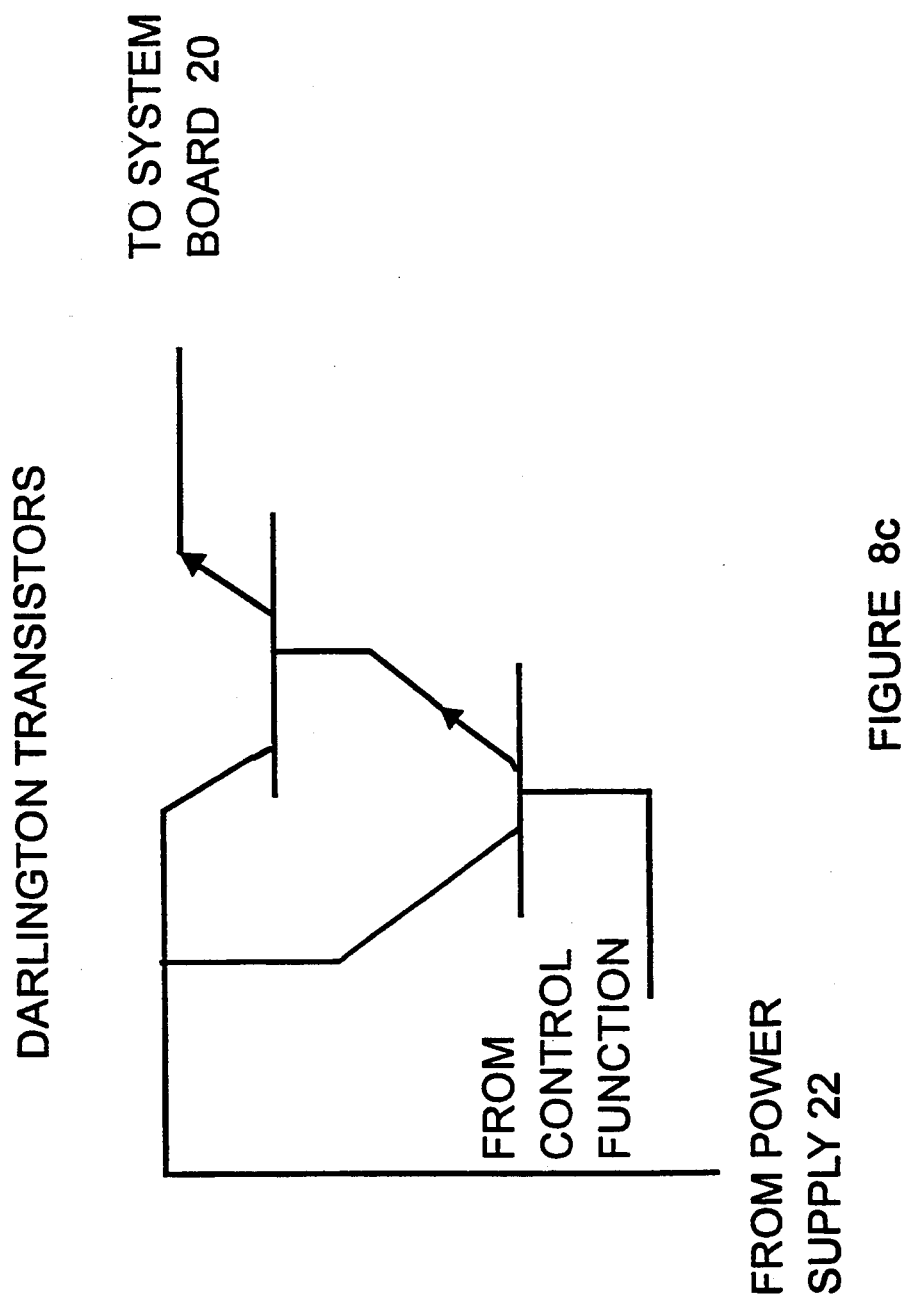
Figure 8D:
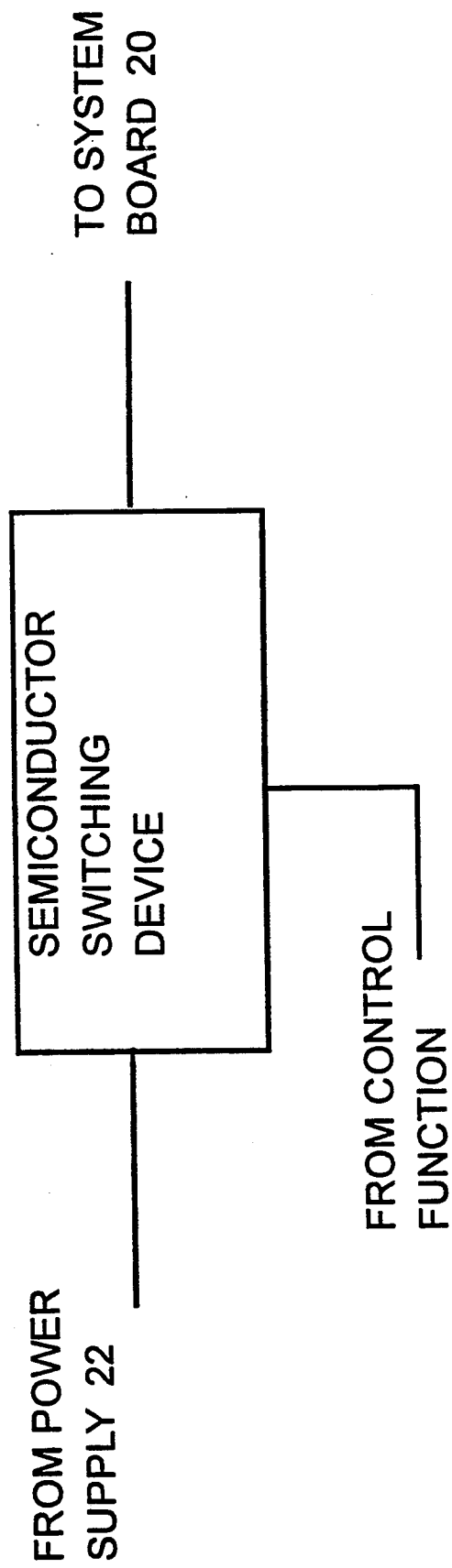

In addition the signal sensor 76 may control power control 58 through control signal 98. Control signal 98 causes power control 58 to turn off power to the floppy drive 24 to prevent unauthorized access to the computer system with or without alarming. In this way various levels of user operation may be selected for the computer system S. Power control 58 may be comprised of relays (FIG. 8a), transistors (FIG. 8b), a plurality of darlington transistors (FIG. 8c), or semiconductor switching devices (FIG. 8d), all of these devices are well known as power switches to those skilled in the art of switching direct current power.

Figure 7:
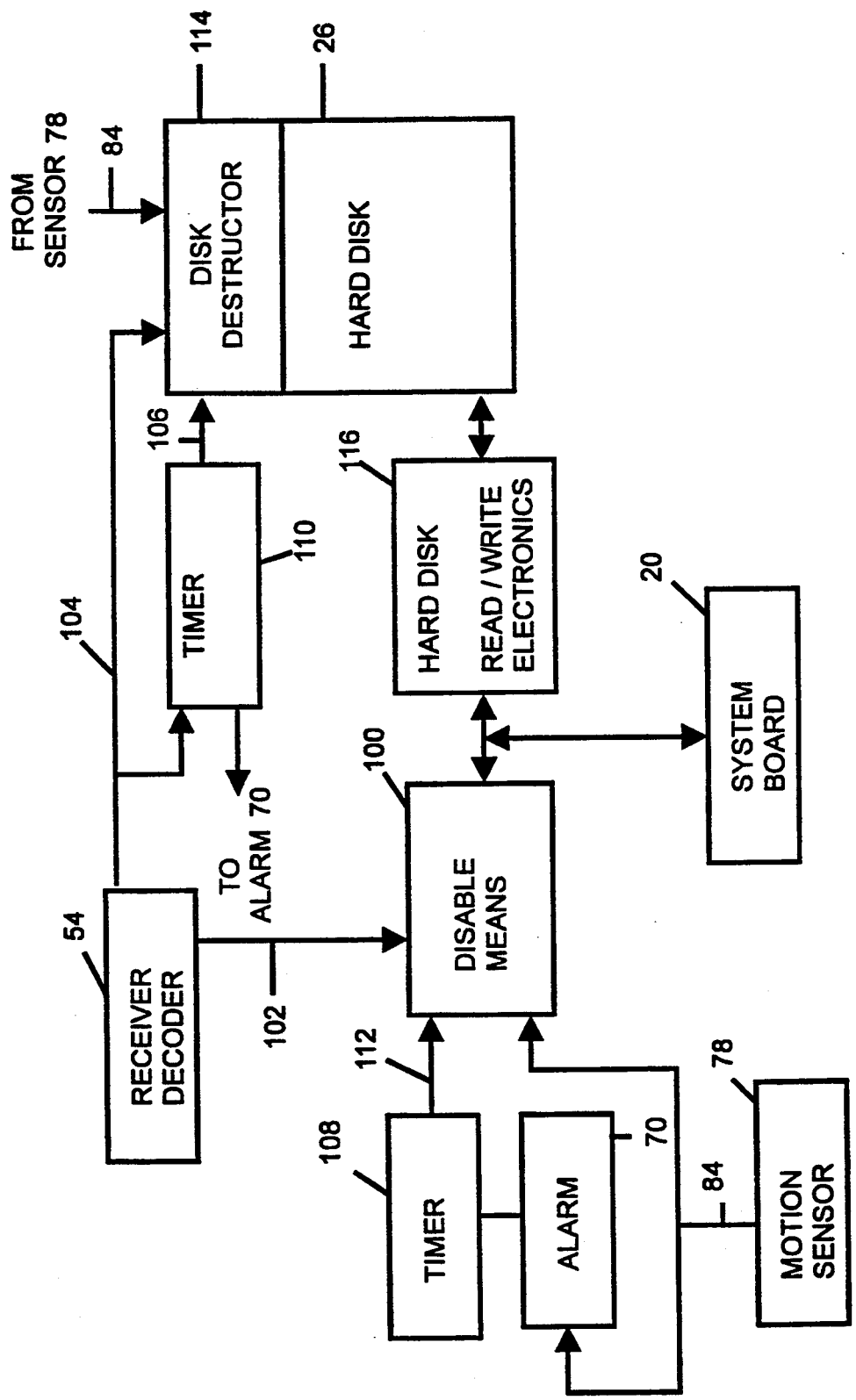
FIG. 7 is a schematic block diagram of a part of the preferred embodiment of the present invention illustrating means to disable data access.

Referring now to FIG. 7, a schematic block diagram illustrates a memory access disable feature of the present invention. For highly sensitive data stored in the hard disk 26, drastic action may be required to prevent the sensitive data from being accessed by unauthorized people. The drastic action may be the destruction of the disk read circuits 116 or destruction of the hard disk 26. The destructive devices may be a high voltage that will destroy the electronic components of the read access circuits, or a microexplosive or acid to mechanically render the hard disk inoperative.

To arm these destructive means, receiver decoder 54 receives and decodes a coded signal from the transmitter 52 (FIG. 6). The decoded signal arms or disarms the disable means 100 and/or disk destructor 114. Once armed, a signal 84 from motion sensor 78 will cause timers 108 and 110 to start timing and cause alarm 70 to signal an audible alert. In addition, the disable means 100 and disk destructor 114 are armed and ready, but waiting for the timers 108 and 110 to time out before destroying the disk read circuits 116 or hard disk 26, respectively. If a disarm command signal is not received by receiver 54 before the timers 108 or 110 time out, then the computer system memory is destroyed. The alarm warns of eminent potential destruction and allows an authorized user to disarm the security destruct system before any damage to the memory system occurs.

The system and method of the present invention, therefore, is well adapted to carry out the objects and attain the ends and advantages mentioned as well as others inherent therein. While a presently preferred embodiment of the invention has been given for purposes of disclosure, numerous changes in the details of construction, interconnection and arrangement of parts will readily suggest themselves to those skilled in the art and which are encompassed within the spirit of the invention and the scope of the appended claims.

What is claimed is:

1. An apparatus for alarming when unauthorized operation or handling of a computer system is attempted, comprising:
    an electrical signal sensor which detects an input signal generated by unauthorized operation or handling of the computer system, said sensor generating an output signal upon detection of the input signal;
    an alarm having armed and disarmed states; and
    means for selecting the armed and disarmed states of said alarm, said selecting means connected to said alarm,
    said sensor being connected to said alarm, whereby the output signal of said sensor actuates said alarm when in the armed state.

2. The apparatus of claim 1, wherein said alarm is an electronic siren which produces a plurality of high decibel sounds.

3. The apparatus of claim 1, wherein said selecting means is a switch.

4. The apparatus of claim 1, wherein said selecting means is a remotely controllable switch.

5. The apparatus of claim 1, further comprising a battery for powering said alarm.

6. An apparatus for preventing unauthorized access to a computer system by controlling power distribution to components of the computer system and alarming when unauthorized operation or handling of the computer system is attempted, comprising:
    means for controlling power distribution to components of the computer system, said control means adapted for connection to a computer system power supply;
    said control means having enabled and disabled states, wherein said control means connects power to the components of the computer system when in the enabled state and disconnects power when in the disabled state;
    means for detecting unauthorized operation or handling of the computer system, said detecting means generating a signal when there is unauthorized operation or handling of the computer system;
    an alarm having armed and disarmed states; and
    means for selecting said control means enabled and disabled states and said alarm armed and disarmed states, wherein said selecting means has one or more unique codes for selecting the enabled and disabled states of said control means and the armed and disarmed states of said alarm,
    said detecting means being connected to said alarm, wherein the signal of said detecting means actuates said alarm when in the armed state.

7. The apparatus of claim 6, wherein said selecting means is a radio frequency transmitter and receiver having coded signals for selecting a plurality of functions.

8. The apparatus of claim 6, wherein said selecting means is an infrared transmitter and receiver having coded signals for selecting a plurality of functions.

9. The apparatus of claim 6, wherein said selecting means is an ultrasonic transmitter and receiver having coded signals for selecting a plurality of functions.

10. The apparatus of claim 6, wherein said selecting means is a voice recognition receiver for decoding unique voice commands to select a plurality of functions.

11. The apparatus of claim 6, wherein said selecting means is a finger print reader for recognizing unique finger prints to select a plurality of functions.

12. The apparatus of claim 6, further comprising a programmable time clock connected to said selecting means and used to prevent selecting the enabled state of said control means before a programmed length of time has elapsed.

13. The apparatus of claim 6, wherein said detecting means is a motion sensor.

14. The apparatus of claim 13, wherein said motion sensor is a mercury switch having a first state when sensing the computer system in a horizontal and stationary position, and having a second state when sensing that the computer system is being moved, whereby the second state causes an output signal to be generated by said mercury switch.

15. The apparatus of claim 6, further comprising means to connect said detecting means to said control means for selectively disabling power distribution to the components of the computer system upon detecting unauthorized access to the computer system.

16. An apparatus for preventing unauthorized access to data contained within a memory storage device of a computer system by disabling data read access circuits of the memory storage device, comprising:
   means for detecting unauthorized operation or handling of the computer system, said detecting means generating a signal when there is unauthorized operation or handling of the computer system;
   means for disabling memory storage data read access circuits of the computer system, said disabling means having armed and disarmed states;
   said disabling means adapted for connection to a memory storage device of the computer system; and
   means for selecting the armed and disarmed states of said disabling means, said selecting means connected to said disabling means,
   said detecting means being connected to said disabling means, whereby the signal of said detecting means actuates said disabling means when in the armed state and said disabling means disables the data read access circuits of the memory storage device.

17. The apparatus of claim 16, wherein said disabling means is a high voltage generator connected to the computer system memory storage device for the purpose of destroying the data read access circuits contained therein.

18. The apparatus of claim 16, wherein said disabling means is a microexplosive device for destroying the computer system memory storage device.

19. The apparatus of claim 16, further comprising:
   a means for time delay, said time delay means inhibiting actuation of said disabling means for a predetermined time; and
   an alarm for alarming during the predetermined time.

20. An apparatus for preventing unauthorized access to a computer system by controlling power distribution to components of the computer system, comprising:
   means for controlling power distribution to components of the computer system;
   said control means having enabled and disabled states, wherein said control means is adapted for connection between a computer system power supply and the computer system components and connects power to the components of the computer system when in the enabled state and disconnects power when in the disabled state; and
   means for selecting the enabled and disabled states of said control means, wherein said selecting means has one or more unique codes for selecting the enabled and disabled states of said control means.

21. The apparatus of claim 20, wherein said control means is a relay.

22. The apparatus of claim 20, wherein said control means is a transistor.

23. The apparatus of claim 20, wherein said control means is a plurality of transistors.

24. The apparatus of claim 20, wherein said control means is a semiconductor switching device.

25. An apparatus for preventing unauthorized access to a computer system by controlling power distribution to components of the computer system and alarming when unauthorized handling of the computer system is attempted, comprising:
   a remotely controllable power switch having on and off states for distributing power to components of the computer system, said power switch adapted for connection between a power supply and the components of the computer system;
   a motion detector for detecting unauthorized handling of the computer system, said motion detector generating a signal when there is unauthorized handling of the computer system;
   an alarm having armed and disarmed states; and
   a wireless remote control transmitter and receiver system having a plurality of coded signals for controlling said power switch and alarm states,
   said motion detector being connected to said alarm, whereby the signal of said motion detector actuates said alarm when in the armed state.

26. An method for preventing unauthorized access to a computer system by controlling power distribution to components of the computer system and alarming when unauthorized operation or handling of the computer system is attempted, comprising the steps of:
   controlling power distribution to subsystems of the computer system with a remotely controllable switch having on an off states, and adapted for connection between a power supply and the subsystems of the computer system;
   selecting the on state of the remotely controllable switch to enable the computer system and the off state to disable the computer system;
   detecting unauthorized operation or handling of the computer system with a signal or motion sensor, respectively; and
   arming an alarm in response to detecting the unauthorized operation or handling, whereby the alarm signals the unauthorized operation or handling of the computer system.

27. A method for preventing unauthorized access to data contained within a memory storage device of a computer system by disabling data read access circuits of the memory storage device, comprising the steps of:
   detecting unauthorized operation or handling of the computer system with a signal or motion sensor, respectively; and
   disabling data read access circuits of the memory storage device of the computer system when an unauthorized operation or handling of the computer system is detected.

28. The method of claim 27, further comprising the steps of:
   delaying for a predetermined time the disabling of data read access circuits of the memory storage device; and
   alarming during the predetermined time.

29. A method for preventing unauthorized access to a computer system by disabling power to components of the computer system when detecting selected input command codes, comprising the steps of:
   detecting unauthorized access to the computer system with a signal sensor that detects selected input command codes; and
   disabling power to selected components of the computer system upon detection of the selected input command codes.

* * * * *